J. D. BROWN.
HARROW.
APPLICATION FILED JULY 12, 1919.
1,341,538.
Patented May 25, 1920.
2 SHEETS—SHEET 1.
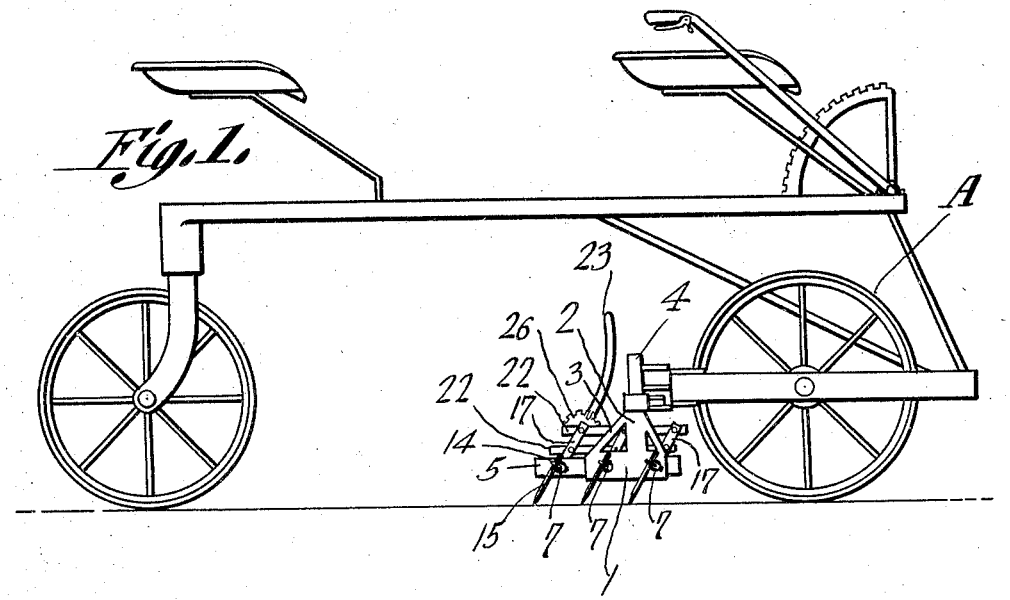
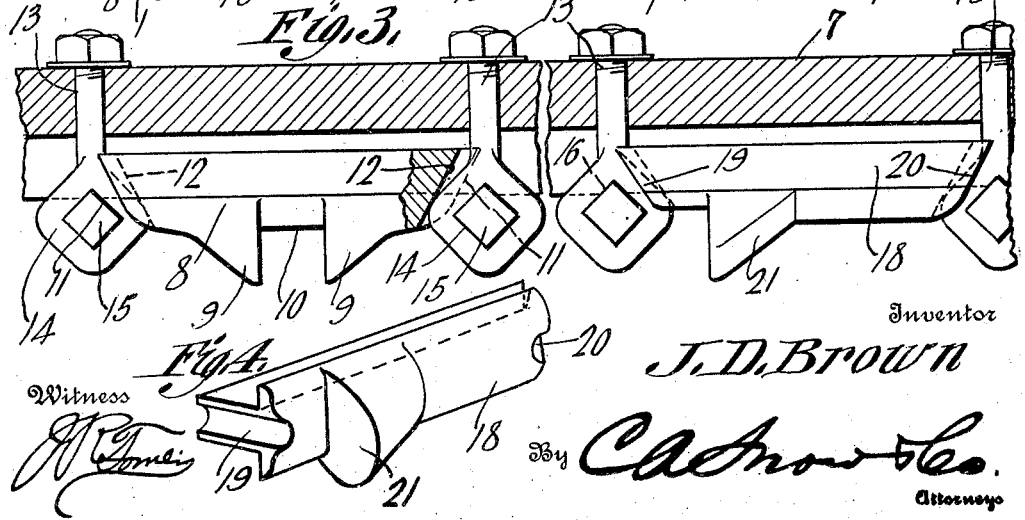
Inventor
J. D. Brown

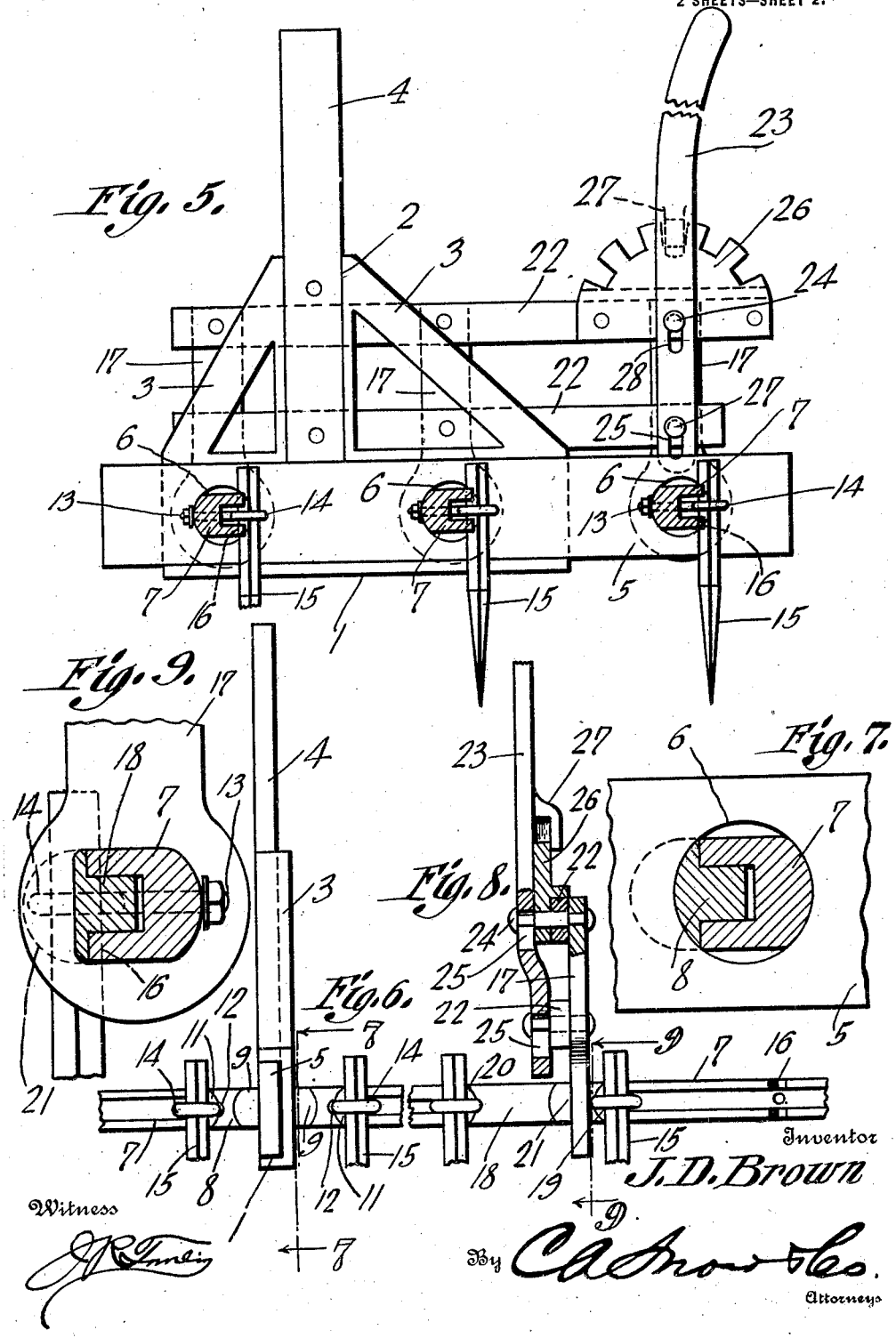

UNITED STATES PATENT OFFICE.

JOHN D. BROWN, OF LAS ANIMAS, COLORADO.

HARROW.

1,341,538.

Specification of Letters Patent.

Patented May 25, 1920.

Application filed July 12, 1919. Serial No. 310,380.

*To all whom it may concern:*

Be it known that I, JOHN D. BROWN, a citizen of the United States, residing at Las Animas, in the county of Bent and State of Colorado, have invented a new and useful Harrow, of which the following is a specification.

This invention relates to harrows for use in breaking the crust of land under cultivation and is particularly designed for use in the cultivation of beets although it is also useful in the cultivation of other vegetables and of grains.

One of the objects of the invention is to provide an implement for use in connection with any standard form of riding attachment, there being novel means for holding the teeth and other parts of the harrow properly assembled.

Another object is to provide simple and efficient means for simultaneously adjusting the teeth of the harrow to a desired inclination relative to the surface of the ground.

With the foregoing and other objects in view, which will appear as the description proceeds, the invention consists of certain novel details of construction and combinations of parts which will be hereinafter more fully described and pointed out in the claims, it being understood that various changes may be made in the construction and arrangement of the parts without departing from the spirit or sacrificing any of the advantages of the invention as set forth in the appended claims.

In the accompanying drawings the preferred form of the invention has been shown.

In said drawings—

Figure 1 is a side elevation of the harrow connected to a riding attachment.

Fig. 2 is a rear elevation thereof.

Fig. 3 is an enlarged horizontal section through a portion of one of the harrow bars and showing spacing blocks in position therein.

Fig. 4 is a detail view of one of the spacing blocks.

Fig. 5 is an enlarged transverse section through the harrow.

Fig. 6 is an elevation of a portion of one of the harrow bars and its connection with a standard.

Fig. 7 is a section on line 7—7, Fig. 6.

Fig. 8 is a view partly in section and partly in elevation of a portion of one of the bars and one of the tilting arms connected thereto.

Fig. 9 is a section on line 9—9, Fig. 8.

Referring to the figures by characters of reference, 1 designates a channeled member provided with an upstanding channeled portion 2 having integral braces 3 and secured within the channeled member 2 is a standard 4 adapted to be secured in the usual manner to a riding attachment indicated generally at A and which can be of any well known type generally used for carrying plows, cultivators, etc. The said standards 4 are adapted to be substituted for other kinds of implements when the present invention is to be used.

Preferably four of the standards are used in transverse alinement and each of the channeled members 1 has a bar 5 secured therein and extending rearwardly therefrom. Each bar 5 has preferably three circular openings therein as shown at 6 certain of these openings registering with corresponding openings in the members 1. Extending through the openings 6 are parallel channeled rock bars 7 and fitted within each of these bars are combined spacing and bearing blocks 8. Each block has outstanding spaced ears 9 forming a recess 10 therebetween adapted to receive the wall of one of the openings 6 and both ends of each block are beveled, as at 11 and provided with grooves 12. The blocks are assembled by first inserting them in the openings 6 with the walls of the openings extending into the recesses 10. The channeled bars 7 are then inserted longitudinally into the openings 6 and astride the blocks. Bolts 13 having heads providing square eyes 14 are inserted through the bars 7 so that the heads will lie in the grooves 12 and harrow teeth 15 are extended through the eyes and within notches 16 in the edges of the bars. By then tightening the bolts the teeth are drawn tightly against the bars and into the notches and the heads of the bolts are held firmly in the grooves 12, thereby holding the blocks 8 against longitudinal movement in the bars 7 and holding the bars against longitudinal movement relative to the bars 5.

The bars 7 are provided, adjacent each end or side of the harrow with means whereby they are to be rotated simultaneously, thereby to adjust the harrow teeth angularly relative to the surface of the soil. The bars 7 have arms 17 fitted thereon and extending upwardly therefrom. The angular head of a tooth fastening bolt 13 is located at one side of each of the arms 17 and extending into the arm from the other side is one end of a spacing block 18 having a beveled grooved end 19 for engagement with said belt head and also having its other end beveled and grooved, as at 20, for engagement with the head of another tooth holding bolt 13. An ear 21 extends outwardly from the block 18 and serves to hold the arm 17 against movement laterally in one direction relative to the bar 7 on which it is mounted. The arms 17 at each side of the harrow are in alinement and are connected by upper and lower strips 22 forming a parallelogram, the said strips being pivotally connected to the arms. A hand lever 23 is connected to one of the arms 17 of each group, it being mounted for a limited sliding movement on the attaching rivets 24 which extend through short slots 25 in the lever. A toothed segment 26 is secured on the upper strip 22 and the lever 23 has a finger 27 which extends from the lever and normally is seated by gravity in one of the notches in the segment. The arms are thus held against tilting movement. By lifting the lever 23, however, so as to disengage the finger 27, the arms 17 can be tilted simultaneously and all of the bars 7 thus be rotated so as to adjust the teeth 15 angularly relative to the surface of the soil. The teeth are adapted to be inclined rearwardly and downwardly so that, when the harrow is drawn over the ground the teeth will drag thereover and break up the thin crust of the soil.

It will be noted that the various parts of the harrow can be assembled readily and, when assembled, will be held together securely.

What is claimed is:—

1. In a harrow the combination with parallel channeled bars, of members having apertures through which the bars extend, blocks seated in the channels in the bars and projecting into the members, bolts engaging the bars and having heads lapping the ends of the blocks to hold the blocks against movement within the channels, and teeth extending through and secured to the bars by the heads.

2. In a harrow the combination with parallel channeled bars and means for simultaneously rocking the bars, of bars having apertures through which the channeled bars extend, tooth fastening bolts extending through the channeled bars and having tooth receiving heads, blocks seated in the channels in the bars and having bearing portions within the apertures in the apertured bars, the ends of the blocks being lapped and held to the channeled bars by the heads of the bolts, and an ear projecting from each of the blocks and engaging a side of an apertured bar.

3. A harrow including apertured bars, channeled bars mounted for rotation in said apertured bars, blocks seated in the channeled bars and having spaced ears, said blocks bearing in the apertured bars and having their ears lapping the bars extending into the spaces between the ears, the ends of the blocks being beveled, and tooth engaging and securing bolts extending through the channeled bars and lapping and retaining the beveled ends of the blocks.

4. In a harrow a channeled member, a channeled portion extending therefrom and integral therewith, braces integral with said member and channeled portion, a standard secured in the channeled portion, an apertured bar secured in the channeled member, channeled bars mounted for rotation in said bar and channeled member, bearing blocks seated in the channeled bars and extending through the apertured bar, said blocks having beveled ends, ears upon the blocks and lapping the sides of the apertured bar, and tooth fastening bolts having heads lapping and holding the ends of the blocks.

5. In a harrow the combination with parallel bars, of members having apertures through which the bars extend, blocks connected to the bars and projecting into the members, bolts engaging the bars and having heads lapping the ends of the blocks to hold the blocks against movement relative to the bars, and teeth extending through and secured to the bars by the heads.

In testimony that I claim the foregoing as my own, I have hereto affixed my signature in the presence of two witnesses.

JOHN D. BROWN.

Witnesses:
W. T. CLARK,
JOHN R. HAFER.